United States Patent [19]

Harper

[11] Patent Number: 5,121,496
[45] Date of Patent: Jun. 9, 1992

[54] METHOD FOR CREATING, MAINTAINING AND USING AN EXPERT SYSTEM BY RECURSIVELY MODIFYING CALIBRATION FILE AND MERGING WITH STANDARD FILE

[75] Inventor: Karl E. Harper, Winter Park, Fla.

[73] Assignee: Westinghouse Electric Corp., Pittsburgh, Pa.

[21] Appl. No.: 224,508

[22] Filed: Jul. 25, 1988

[51] Int. Cl.⁵ .................................................. G06F 7/14
[52] U.S. Cl. .................................. 395/600; 364/274.2; 364/274.5; 364/222.82; 364/222.81; 364/DIG. 1; 395/1
[58] Field of Search ................ 364/200, 200 MS File, 364/900 MS File, 513, 550

[56] References Cited

U.S. PATENT DOCUMENTS

| 4,328,556 | 5/1982 | Abe | 364/492 |
|---|---|---|---|
| 4,591,983 | 5/1986 | Bennett | 364/403 |
| 4,628,434 | 12/1986 | Tashiro et al. | 364/513 |
| 4,642,782 | 2/1987 | Kemper | 364/550 |
| 4,644,479 | 2/1987 | Kemper et al. | 364/513 |
| 4,649,515 | 3/1987 | Thompson et al. | 364/513 |
| 4,670,848 | 6/1987 | Schramm | 364/200 |
| 4,713,775 | 12/1987 | Scott et al. | 364/513 |
| 4,736,296 | 4/1988 | Katayama et al. | 364/200 |
| 4,740,886 | 4/1988 | Tanifuji | 364/148 |
| 4,763,277 | 8/1988 | Ashford et al. | 364/513 |
| 4,779,208 | 10/1988 | Tsuruta et al. | 364/513 |
| 4,803,641 | 2/1989 | Hardy | 364/900 |
| 4,803,642 | 2/1988 | Muranaga | 364/513 |
| 4,809,219 | 2/1989 | Ashford | 364/900 |
| 4,841,473 | 6/1989 | De Paul | 364/900 |
| 4,845,649 | 7/1989 | Eckardt | 364/571.02 |
| 4,847,784 | 7/1989 | Clancey | 364/513 |
| 4,849,879 | 7/1989 | Chinnaswamy | 364/513 |
| 4,849,905 | 7/1989 | Loeb | 364/513 |
| 4,853,683 | 5/1989 | Phillips | 364/200 |
| 4,866,634 | 9/1989 | Rebol | 364/900 |
| 4,866,635 | 9/1989 | Kahn | 364/200 |
| 4,881,230 | 11/1989 | Clark | 364/200 |
| 4,884,217 | 11/1989 | Skeirik | 364/513 |
| 4,901,247 | 2/1990 | Wakimoto | 364/513 |
| 4,903,215 | 2/1990 | Masuishi | 364/513 |
| 4,920,499 | 4/1990 | Skeirik | 364/200 |
| 4,931,951 | 6/1990 | Murai | 364/200 |
| 4,943,933 | 7/1990 | Miyamota | 364/513 |

Primary Examiner—Thomas C. Lee
Assistant Examiner—Eric Coleman

[57] ABSTRACT

A method for creating, maintaining and using an expert system segregates the rulebase for the expert system into a standard rulebase and a calibration rulebase. The standard rulebase is stored in a read-only file, while the calibration rulebase is stored in a read/write file. An identical standard rulebase is provided for several units of a model or pieces of equipment of one type, while each unit has its own calibration rulebase. The operator of a unit is given access to the calibration rulebase to make modifications to the calibration properties for that particular unit. The calibration rulebase for a specific unit is then merged with the standard rulebase to form the application rulebase used in evaluating the unit.

7 Claims, 1 Drawing Sheet

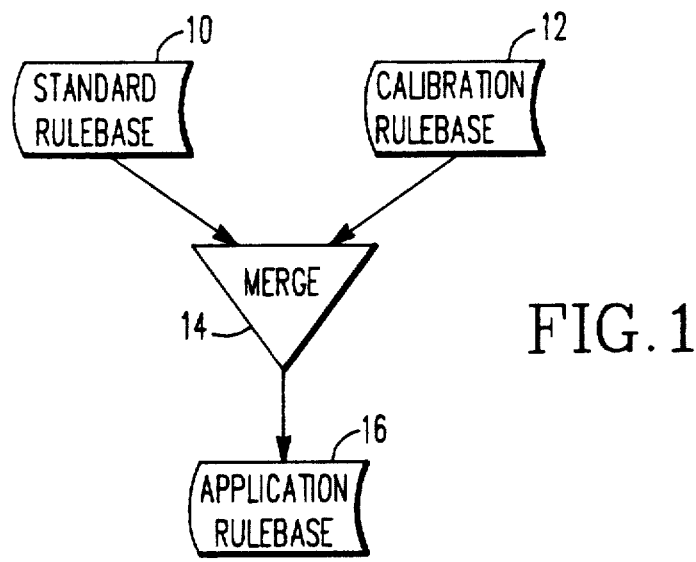
FIG.1
FIG.2A
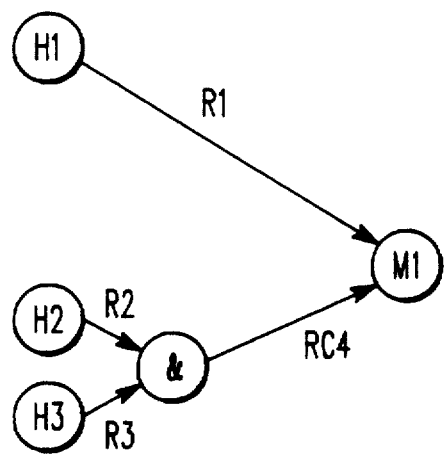
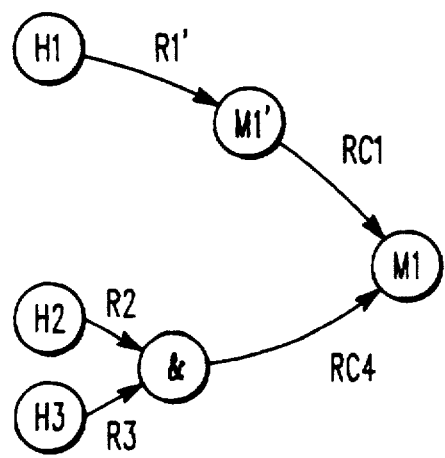
FIG.2B

METHOD FOR CREATING, MAINTAINING AND USING AN EXPERT SYSTEM BY RECURSIVELY MODIFYING CALIBRATION FILE AND MERGING WITH STANDARD FILE

BACKGROUND OF THE INVENTION

1. Field of the Invention

The present invention is related to the creation, maintenance and use of computerized expert systems, and, more particularly, to a method for creating and maintaining an expert system rulebase for use with different pieces of equipment of the same type.

2. Description of the Related Art

There is currently an increasing use of expert systems for evaluating equipment, particularly during operation. With many types of equipment, such as electrical generators used by power companies and other types of equipment of similar size, there are several pieces of equipment of a single type or model which are constructed to be virtually identical. However, due to differences in the construction process or the environment in which pieces of equipment are operated, there are variations in the values of certain parameters or sensor readings for a type of equipment which are consistent for a specific unit. Such characteristics are conventionally expressed as, e.g., "it tends to run hot" or "this one's a little slow to warm up", etc.

Existing expert systems typically allow for such variations between units by maintaining a single rulebase for each piece of equipment. If it is discovered that a change should be made to the rulebases for all pieces of equipment of a certain type, each rulebase must be changed individually. The change cannot be made once and copied to the other rulebases, because then the properties unique to a specific piece of equipment would be overwritten by properties in the rulebase which was first modified. Some expert systems may attempt to alleviate such problems by segregating properties into one file defining rules and another file defining parameters. This would allow changes to the rules to be copied from one rulebase to another without affecting the parameters, but does not allow for rules to be unique to a specific piece of equipment or for a change to the parameter file to be made in common to all pieces of equipment of a specific type.

SUMMARY OF THE INVENTION

An object of the invention is to provide a method for efficiently creating and maintaining an expert system used to evaluate several pieces of equipment which are very similar.

Another object of the present invention is to provide a method for maintaining control over common properties of a rulebase for such an expert system while allowing the rulebase to be tailored for a specific piece of equipment.

These objects are attained by providing a method of creating, maintaining and using a computerized expert system rulebase on a domain, the method comprising the steps of: storing standard properties, commonly used for different units within the domain of the rulebase, in a subsequently read-only standard file; storing calibration properties, expected to be unique for different units within the domain of the rulebase, in at least one subsequently modifiable calibration file; and merging the standard and calibration files for application to a single unit within the domain of the rulebase.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 1 is a block diagram of the file structure of an expert system rulebase according to the present invention;

FIG. 2A is a rule net diagram of a prior art rulebase; and

FIG. 2B is a rule net diagram of a rulebase according to the present invention.

DESCRIPTION OF THE PREFERRED EMBODIMENT

The block diagram in FIG. 1 illustrates an essential feature of the present invention. A standard rulebase 10 is stored as a read-only file for all subsequent uses. Standard properties which are commonly used for different units within the domain of the rulebase are stored in the standard rulebase 10. A separate file 12 is created to store calibration properties which are expected to be unique for different units within the domain of the rulebase. The calibration rulebase 12 is a read/write file and thus constitutes a subsequently modifiable calibration file. Prior to the first use of the rulebase, the standard and calibration rulebases 10 and 12 are subjected to a merge operation as indicated at 14 to form an application rulebase 16 which preferably is a read-only file. The application rulebase 16 is used like a conventional expert system rulebase to evaluate equipment within the domain of the rulebase. Such rulebases are typically used to diagnose the cause of improper operation of heavy equipment such as generators in a power station, so that repairs may be made to components during scheduled down time, prior to the complete failure of the components. It should be understood that this is not the sole present use of expert system rulebases and that the present invention can be applied to expert systems used for many different purposes.

When it is desired to make a correction to the application rulebase 16 due to a condition or setting related to a specific unit or individual within the domain of the rulebase, the calibration rulebase 12 is modified and the merge operation 14 is repeated to create a new application rulebase 16. On the other hand, when it is determined that a change to the application rulebase 16 is applicable to all or substantially all of the units within the domain of the standard rulebase 10, a new standard rulebase 10 is created and merged with the calibration rulebase 12 corresponding to each of the units to create an application rulebase 16 for each of the units within the domain. Changes to the standard rulebase 10 are likely to be much less frequent than changes to the calibration rulebase 12. It may occasionally be necessary to make changes to some or all of the calibration rulebases 12 in a response to a change to the standard rulebase 10, but typical changes to the standard rulebase 10 can be made much more efficiently than in a conventional expert system. In a conventional system only application rulebases 16 exist, each application rulebase 16 corresponding to a specific unit and having many properties in common with the application rulebases 16 corresponding to other units of the same domain or type of equipment, but each has to be modified individually.

Taking the example of a generator at a power station, typically several units of one model of generator are constructed for different power stations around the country or around the world. In some cases, a single power company may have several units of the same model, some at the same power station. The greatest similarity between units would probably be in the case of several units of the same model at the same power station, all of which were manufactured and put into operation at approximately the same time. However, even in this situation, variations in the manufacturing process or the load which they experience due to differences in down time, etc., can result in slight differences in the units, especially after the passage of several years. Even greater differences between units of the same model can be expected due to different operating conditions at different power companies, particularly units used in another country having a different electrical network and operating conditions.

Each unit of the model of generator is evaluated using a unique application rulebase 16. This application rulebase 16 is formed by merging a standard rulebase 10 that applies to all of the units of this model of generator with a calibration rulebase 12 that is unique to the corresponding unit or piece of equipment. In the scenario described above, it is expected that the majority of the properties in the application rulebase 16 will be derived from the standard rulebase 10 due to the great similarity between units. The units operated in another country, can be expected to have the largest number of calibration properties in the calibration rulebase 12 because the operating conditions to which those units are exposed are likely to be the most different from the operating conditions to which the units in this country are exposed.

FIGS. 2A and 2B provide specific examples of how the properties in the calibration rulebase 12 are merged with properties in the standard rulebase 10. FIGS. 2A and 2B are rule net diagrams illustrating how three hypotheses H1, H2 and H3 are combined to provide a diagnosis of malfunction M1. Although no input is illustrated into the hypotheses H1, H2 and H3, these hypotheses are determined as is known in the art by applying rules to sensor readings or other input data. The rule net diagram in FIG. 2A illustrates that if either the first hypotheses H1 meets the requirements of a first rule R1 or second and third hypotheses H2 and H3 respectively meet the requirements of rules R2 and R3 and together meet the requirements of rule R4, then malfunction M1 is diagnosed.

In a conventional expert system, if a rule, such as rule R1 needs to be changed for a specific unit, then the rule itself would be changed so that rule R1 in an application rulebase corresponding to that unit would be different from rule R1 in the rulebases corresponding to all the other units of that model. As time passes, it is likely that none of the rulebases for the units of a model would be exactly the same. As a result, if it is determined that rule R2 should be changed for all units of the model based upon additional information which has been learned about the performance of that model, the change to rule R2 would have to be made to each application rulebase individually.

According to the present invention, properties, whether representing parameters or rules, in a rulebase which are expected to vary from unit to unit, are stored in a calibration rulebase 12. Thus, if it is necessary to change a rule, such as the rule corresponding to rule R4 in FIG. 2A, rule RC4 of FIG. 2B, which is stored in the calibration rulebase for a specific unit, would be modified. As another example, assume that the hypotheses H1, H2 and H3 and rules R2 and R3 are stored in the standard rulebase. If it is necessary to make a change to rule R2 in all the units of a model, the change can be made to one copy of the standard rulebase and that standard rulebase can be copied to or recreated at each site where an application rulebase exists for each unit of the model. Then, it is only necessary to perform another merge operation 14 to recreate the application rulebase 16. Both the copying and merge operations are automatic operations which do not require the entry of any unique commands to make a change in the application rulebase.

The types of changes which can be made to the calibration rulebase include changing previously stored calibration properties, such as rule RC4 or adding new calibration properties. For example, assuming rule R1' in FIG. 2B was originally stored in the calibration rulebase as indicating that malfunction M1 should be diagnosed under c3rtain conditions if hypothesis H1 exists, this rule could be changed to indicate existence of an intermediate node M1' and malfunction M1 would be diagnosed only if rule RC1 is met.

In other words, in the standard rulebase there would be no rules indicating that malfunction M1 is diagnosed. Only when rules R1', RC1 and R4 together with intermediate node M1', stored in the calibration rulebase 12, are merged with the standard rulebase, will the application rulebase 16 have a rule net diagram like that illustrated in FIG. 2B.

If, on the other hand, rule R1 in FIG. 2A is stored in the standard rulebase 10 and it is desired to produce an application rulebase like that illustrated in FIG. 2B, it is necessary to either have a new standard rulebase created without rule R1 or to somehow override rule R1. Preferably, all of the rules in the standard and calibration rulebases are included in the application rulebase; therefore, if the standard property cannot be modified by adding a calibration property, the standard property should be deleted.

The calibration rules illustrated by curved lines in FIG. 2B represent examples of different types of calibration properties. The rule RC4 is an example of storing, as one of the calibration properties, a rule establishing a first confidence level for a first condition (M1) in response to at least a second confidence level of a second condition (the combination of applying rules R2 and R3 to hypotheses H2 and H3). Another use of a calibration property would be to exclude the diagnosis of a malfunction which is always displayed and therefore provides no useful information. This can be provided by storing as one of the calibration properties a rule (RC1) which says that only if malfunction M1' has a confidence level which is never attainable, will malfunction M1 be diagnosed. In this case, rule R1' would be the same as rule R1 in FIG. 2A except that the object or result of the rule is the setting of the confidence level for intermediate node M1' instead of malfunction M1.

Many other examples could be given for how a calibration rulebase could modify a standard rulebase. The properties stored in the calibration rulebase are not limited to rules, but include parameters or other properties used in defining a rulebase or knowledge base in a particular expert system. There are currently available many different expert systems which can be purchased commercially. For example, the Personal Consultant Plus is available from Texas Instruments for execution on IBM PC compatible microcomputers. Personal Consultant Plus is an expert system shell which enables rulebases containing separate files for rules and parameters to be developed and accessed. Rulebases in other expert system shells may separate the properties stored in a rulebase in other ways. The present invention can be applied to many different ways of defining a rulebase and is not limited to rulebases comprising only parameters and rules.

Furthermore, the present invention is not limited to the use of a standard rulebase that is applicable only to one model or type of equipment. There may be similar models or types of equipment, such as gas and water cooled generators which have some components in common and other components, i.e., the cooling system, which are significantly different. A single standard rulebase might be created for both gas and water cooled generators and two calibration rulebases, one for the gas-cooled model and one for the water-cooled model. The calibration rulebase for water-cooled generators could be merged with the standard rulebase to form a standard rulebase for water-cooled generators, while the calibration rulebase for gas-cooled generators could be merged with the standard rulebase to form a standard rulebase for gas-cooled generators. This process could be repeated again for different models of gas and water-cooled generators before the standard rulebase for a particular model is merged with the final calibration rulebase for a particular unit of that model. In such a case, the calibration rulebase for, e.g., the water cooled generators may include a calibration property defining a rule establishing a first confidence level for a first condition in response to at least a second confidence level of a second condition, while one of the calibration properties in the second calibration file for gas cooled generators might be a property determining a sufficiency condition for establishing the first confidence level in dependence upon the second confidence level. In other words, in water cooled generators, the first confidence level is determined by applying an unvarying test to the second confidence level, while in the standard rulebase for gas cooled generators, the first confidence level is determined by applying a formula to the second confidence level.

The many features and advantages of the present invention are apparent from the detailed specification and thus, it is intended by the appended claims to cover all such features and advantages of the method which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. A method of creating, maintaining and using a computerized expert system rulebase on a domain, said method comprising the steps of:
   (a) creating a read-only standard file containing standard properties commonly used for different units within the domain of the rulebase;
   (b) storing calibration properties, expected to be unique for different units within the domain of the rulebase, in at least one subsequently modifiable calibration file;
   (c) merging the standard and calibration files to produce a first application file for application to a single unit within the domain of the rulebase;
   (d) modifying the calibration file by at least one of (i) changing previously stored calibration properties and (ii) adding new calibration properties; and
   (e) repeating said merging in step (c) after said modifying in step (d).

2. A method as recited in claim 1, further comprising the step of (f) modifying one of the standard properties for application to the single unit by performing the steps of:
   (fi) recreating the standard file without the one of the standard properties;
   (fii) adding the one of the standard properties to the calibration file as a new calibration property; and
   (fiii) repeating said merging in step (c).

3. A method as recited in claim 1, wherein step (b) comprises the step of storing as one of the calibration properties a rule establishing a first confidence level for a first condition in response to at least a second confidence level of a second condition.

4. A method as recited in claim 1, wherein step (b) comprises the step of storing as one of the calibration properties a rule establishing exclusion of a diagnosis in reports produced by application of the rulebase.

5. A method as recited in claim 1,
   wherein said storing in step (b) comprises:
      (bi) creating first and second calibration files for first and second units;
      (bii) storing as one of the calibration properties in the first calibration file a rule establishing a first confidence level for a first condition in response to at least a second confidence level of a second condition; and
      (biii) storing as one of the calibration properties in the second calibration file a rule stating a sufficiency condition for establishing the first confidence level in dependence upon the second confidence level, and
   wherein step (c) comprises merging each of the first and second calibration files separately with the standard file to produce the first application file and a second application file for application to the first and second units, respectively.

6. A method of creating, maintaining and using a computerized expert system rulebase on a domain, said method comprising the steps of:
   (a) creating a read-only standard file containing standard properties commonly used for different units within the domain of the rulebase;
   (b) storing calibration properties, expected to be unique for different units within the domain of the rulebase, in at least one subsequently modifiable calibration file;
   (c) merging the standard and calibration files to produce a first application file for application to a single unit within the domain of the rulebase.
   (d) creating a new calibration file; and
   (e) merging the new calibration and standard files to produce a second application file for application to another of the different units within the domain of the rulebase.

7. A method of creating, maintaining and using a computerized expert system for evaluation of at least one of construction and operation of equipment, said method comprising the steps of:

(a) creating a standard rulebase for the evaluation of a type of equipment, the standard rulebase being stored in a read-only file;

(b) creating a calibration rulebase for properties expected to vary for different pieces of equipment of the type corresponding to the standard rulebase created in step (a), the calibration rulebase being stored in a read/write file;

(c) merging the standard and calibration rulebases to form a read-only application rulebase for evaluating a selected piece of equipment; and (d) maintaining the computerized expert system, said maintaining comprising the steps of:
  (di) modifying the calibration rulebase without modifying the standard rulebase, and
  (dii) repeating said merging in step (c) after performing step (di).

* * * * *